F. E. ARTZ.
FILM FEEDING MECHANISM.
APPLICATION FILED MAR. 12, 1914.
1,169,758.
Patented Feb. 1, 1916.
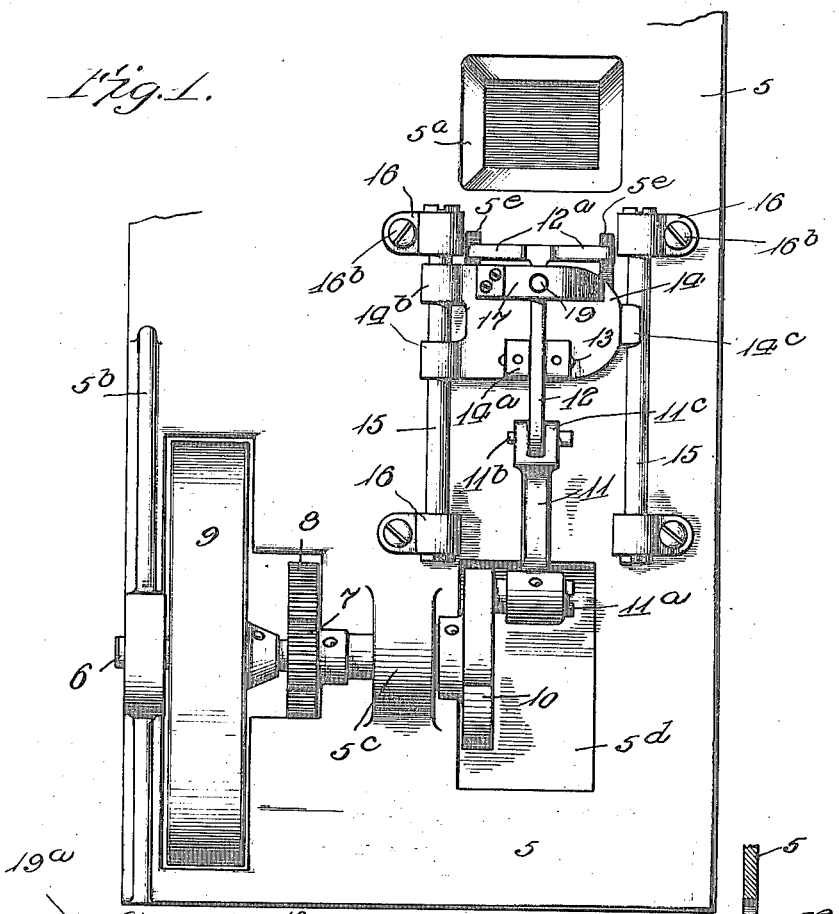
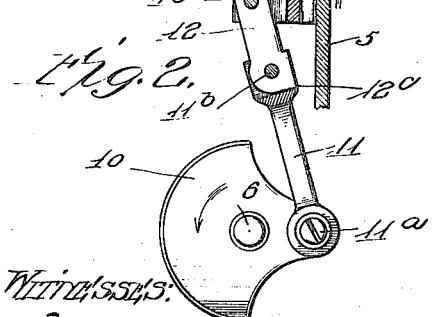
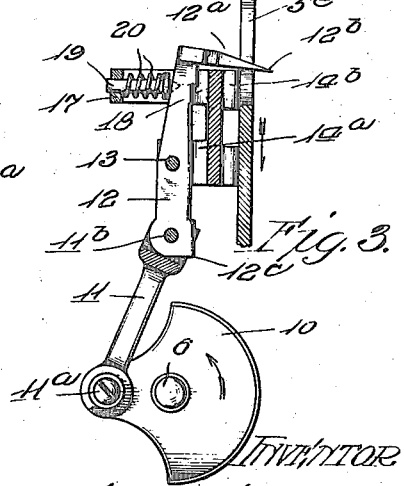

UNITED STATES PATENT OFFICE.

FRANK E. ARTZ, OF CHICAGO, ILLINOIS.

FILM-FEEDING MECHANISM.

1,169,758. Specification of Letters Patent. Patented Feb. 1, 1916.

Application filed March 12, 1914. Serial No. 824,079.

*To all whom it may concern:*

Be it known that I, FRANK E. ARTZ, citizen of the United States, residing at Chicago, in the county of Cook and State of Illinois, have invented certain new and useful Improvements in Film-Feeding Mechanism, of which the following is a specification.

My invention relates to improvements in means for intermittently feeding the film of photo projecting machines and the especial object of my improvements is to provide simple and inexpensive means which will accurately register with the film marginal apertures under the high speed at which such mechanism moves, and which will be free from vibration.

A further object of my improvements is to provide film feeding elements in which lost motion due to wear will be negligible, and in which any worn parts may be easily removed and replaced.

A still further object of my improvements is to provide a film actuating mechanism that will enter and leave the apertures in the film at substantially right angles to the plane of the film in its passage over the exposure opening, thereby avoiding danger of tearing the film or wearing the edges of the apertures.

Other objects of utility and convenience of operation are conserved by my invention as will be apparent to those skilled in the art.

I have illustrated, and will describe in detail, my improved film actuating mechanism, in a preferred form.

In the accompanying drawings:—Figure 1 shows in rear elevation, my invention, and so much of the accompanying parts, as is necessary to disclose its operative connection; Fig. 2 is a view partly in elevation and partly in section, showing the film actuating elements in one operative position, *i. e.*, cleared from the film; Fig. 3 is a view corresponding to Fig. 2, showing the parts in a different position, *i. e.*, engaging the film; Fig. 4 is a detail in plan of the pivoted lever which engages the film.

Referring to the details of the drawing, and the reference numerals thereon, 5 represents the plate or base which carries the operating elements of a photo projecting machine of well known construction. In this plate are the exposure opening $5^a$, and the slots $5^e$, the latter receiving the teeth of the lever which actuates the film, as will be described. Along one edge of the plate 5 is a projecting vertical rib $5^b$, which, with an offset $5^c$ near the center of the plate, provide bearings for a shaft 6, on which is mounted a pinion 7 which is driven by a gear 8. The latter is actuated by any suitable means not shown. A balance or flywheel 9 is also mounted on the shaft 6, and on the inner end of the latter is secured a disk 10. To the disk 10 is attached by a screw-pivot $11^a$, a link 11, the upper end of which is slit or bifurcated to receive the lower end of a lever 12, a pin $11^b$ serving to connect the link and lever at this point. The lever 12 is formed at its upper end with an angular extension $12^a$ which terminates in prongs or teeth $12^b$. The lever 12 is pivotally mounted on a pin 13, which is fixed in lugs $14^a$ projecting from a plate 14, and below the pivot, the end of the lever is formed with a squared shoulder $12^c$. The plate 14 is provided with cylindrical extensions or knuckles $14^b$, along one of its vertical edges, and at its opposite edge with a semi-cylindrical lug $14^c$. The parts $14^b$, $14^c$, slidably engage parallel posts 15, 15, the ends of which are fixed in brackets 16, secured to the plate 5 by screws $16^b$.

To the rear side, and at the upper edge of the plate 14, is secured a yoke 17, which projects at right angles from said plate. Within the yoke are fixed blocks 18, which are spaced apart to provide a guide and slideway for the lever 12, which reciprocates in said yoke. A stud 19, is arranged with its outer end projecting through a suitable hole in the yoke 17, and with its inner end formed with a flange $19^a$, and a conical point, the latter fitting loosely in a corresponding recess in the lever, as indicated by dotted lines. Surrounding the stud 19, with its ends bearing against the yoke and the flange $19^a$ respectively, is an expansion coil-spring 20.

In a mechanism constructed as described, upon motion being imparted to the disk 10, through the instrumentalities described, or any suitable substitutes, it will be obvious that when the link 11 and lever 12 are in the relative positions shown in Fig. 2, in which the squared or shouldered end $12^c$ of the lever, abuts against the adjacent face of the link 11, a stiff joint is thereby effected, so that any movement of the link will cause a corresponding movement of the lever.

These positions are taken during the outward stroke of the lever, so that it is entirely cleared of the film until the instant of the inner or return stroke, when the lever begins to rock upon its rounded portion adjacent the pivot 11$^b$, as shown in Fig. 3. When the travel of the disk 10 moves the link 11 to a position in which the co-acting squared faces of the lever and link begin to separate, the expansive force of the spring 20, applies to force the upper end of the lever forwardly or to its film engaging position shown in Fig. 3.

Having thus described my invention what I claim as new and desire to secure by Letters Patent is:

1. In a cinematograph, a film guideway through which the film is adapted to pass, a reciprocable plate movable substantially parallel to said guideway, a member pivoted to said plate, film engaging means extending laterally from said member toward said guideway, a pitman pivotally connected to said member, and means for actuating said pitman.

2. In a cinematograph, a film guideway through which the film is adapted to pass, a reciprocable plate movable substantially parallel to said guideway, a member pivoted to said plate, film engaging means extending laterally from said member toward said guideway, a pitman, a butt-joint connection between said pitman and said member, and means for actuating said pitman.

3. A film feeding mechanism for cinematographs comprising a film guideway, a drive-wheel, a pitman eccentrically connected thereto, a plate slidably mounted in the path of said pitman, a lever pivoted to said plate, a butt joint connection between said lever and said pitman, laterally extending members upon the opposite end of said lever, and means yieldingly actuating the last-mentioned end of said lever toward said film guideway.

4. In a cinematograph, a film guideway through which the film is adapted to pass, a reciprocable plate movable substantially parallel to said film, a pick pivotally mounted on said plate and adapted to enter said guideway, and means for actuating said pick, said means including a two-piece link pivotally connected by a butt-joint.

In testimony whereof I affix my signature in the presence of two witnesses.

FRANK E. ARTZ.

Witnesses:
EDWIN K. LUNDY,
M. A. MILORD.